United States Patent [19]

Grass

[11] 4,376,555
[45] Mar. 15, 1983

[54] DRAWER SUPPORT AND/OR GUIDE ROLLER WITH AXIAL BEARING PIN

[76] Inventor: Alfred Grass, Konsumstrasse 20, A-6973 Hochst/Vlbg., Austria

[21] Appl. No.: 180,784

[22] Filed: Aug. 25, 1980

[30] Foreign Application Priority Data

Aug. 31, 1979 [AT] Austria .................................. 5798/79

[51] Int. Cl.³ .............................................. F16C 29/00
[52] U.S. Cl. ..................................... 308/3.8; 308/6 R; 308/203; 312/339; 312/341 R
[58] Field of Search ................. 308/3.6, 3.8, 6 R, 203; 312/339, 341, 342, 343, 344; 193/37; 29/110, 116 R, 121.1

[56] References Cited

U.S. PATENT DOCUMENTS 4,057,872  11/1977  Schmidt ........................... 308/3.8 X

*Primary Examiner*—Stuart S. Levy
*Assistant Examiner*—Daniel P. Stodola
*Attorney, Agent, or Firm*—Leonard W. Suroff

[57] ABSTRACT

An assembly for supporting a drawer relative to a rail including an axial bearing pin with a bearing shaft and a rivet pin at opposite ends thereof, a pair of adjacent collars of substantial diameter relative to the bearing shaft and the rivet pin being disposed therebetween. The rivet pin is secured to the rail of the drawer for support of the assembly. One of the collars includes an insertion bevel on the side of the bearing shaft and an oblique shoulder on the opposite side thereof. A support and guide roller having an axial bore and a relatively large outside diameter is mounted on the bearing shaft, which forms, together with the axial bearing pin of relatively small diameter, a load transmitting bearing both in the radial and in the axial directions thereof. A coupling assembly is provided which includes spring-elastic claws for securing the support and/or guide roller with respect to axial displacement while guiding it on the rail. The claws include an insertion flange at the outside thereof, and include a shoulder at the inside thereof with the shoulder extending obliquely to the open side of the claw, so as to obtain releasable securement of the jaws on the collar of the axial bearing pin such that the support and/or guide roller is guided by its face and the oblique shoulder between the face and the oblique shoulder of the roller with certain play therebetween as rolling contact is maintained.

10 Claims, 3 Drawing Figures

DRAWER SUPPORT AND/OR GUIDE ROLLER WITH AXIAL BEARING PIN

The present application is claiming a priority based upon an earlier filed Austrian patent application having Ser. No. 5798/79 and Filing Date Aug. 31, 1979.

BACKGROUND OF THE INVENTION

The invention relates to a support and/or guide roller with axial bearing pins for drawer pull-out or the like, wherein a plastic roller together with the metal axial bearing pin provides a load-transmitting sliding bearing both in the radial and axial directions.

The requirement for quiet and easy operation of drawers presents a problem still not wholly solved for the manufacturer of drawer guide means. The criteria mainly are the high bearing friction between the support and/or guide roller and the axial bearing pin, furthermore the kind of assembly of the bearing pin to the guide rail. A substantial improvement in the quality of displacement already was achieved when using plastic rollers running on a steel bearing pin.

Again, ball bearings are used as rollers, which are partly provided with an outer race surrounded by plastic. Ball bearings can be sized for high loads and are characterized by running lightly; however they are correspondingly expensive.

The easy running of a support and/or guide roller is meant to ensure not only easy displacement for high drawer load, but also the rotation of these support and-/or guide rollers should take place when the drawer loads are small, so that the drawer rail shall roll on the support rollers rather than slide off their circumference. The undesired slide effect results in an uneven wear of the roller circumference and therefore bumpy drawer operation.

Nevertheless, because of the cost factor already mentioned, there is the desire to use rollers of wear-free plastic with still better bearing properties in connection with a metal axial bearing pin, preferably made of steel. However, this matching of sliding bearing so far has failed to provide operation which is as light as with ball bearings so as to obtain rotation when there is the least load, as explained above, on the rollers. Among the significant factors for poor running is the relatively large diameter which is required on account of the one-sided assembly to the rail of the furniture proper. It is known in the pertinent trade that rollers shall run the lighter, the larger the diameter of the rolling surface to that of the bearing bore. The diameter of the roller running surface however depends on the conventional dimensions of drawer guide means as desired by the furniture manufacturers. Attempts to use axial pins as thin as possible while remaining as tough as possible have failed due to the possibility of mounting these axial bearing pins only on one side, namely to the vertical and thin sheet metal flange of a guide rail. In order to ensure the bearing pins be sufficiently firmly seated in the sheet metal flange capable of transmitting the required load from the axial bearing pin to the rail for long-term usage, there must be a specific diameter of the resting surface between the riveted pin and the bearing pin. By means of the riveting procedure, this resting surface is pulled against the sheet metal surface of the furniture-body rail, and the anchoring is thus obtained. The diameter of this resting surface previously determined the diameter of the bearing pin which was required furthermore to be provided with a flange on that side which is opposite the rivet pin so that the plastic roller would be axially supported between the rail and said latter flange.

This conventional axial bearing pin further suffers from the drawback of its assembly. The roller must be placed on the axial bearing pin prior to the riveting process, whereby assembly is extraordinarily hampered and the danger of damaging the rollers is incurred.

OBJECTS OF THE INVENTION

An object of the present invention is to so arrange the guide roller that while being guided, it will be secured against axial displacement and furthermore against warping, in order to offer maximally light operation.

It is a furthermore the object of the present invention to so design this guide and/or bearing means that it can be economically manufactured and easily assembled.

Other objects and advantages of the present invention will become apparent as the disclosure proceeds.

SUMMARY OF THE INVENTION

The present invention is based on a support and/or guide roller with a relatively large outside diameter and running on an axial bearing pin of relatively small diameter.

The problem of the invention is solved by adding to the pin and/or roller guide means detachably connected thereto by compressive force, for instance concentrically mounted, spring-elastic claws, which secure the roller against axial displacement.

It is assumed in this approach that securing against axial displacement cannot be achieved by securing means directly mounted on the axial bearing pin and tightened to it by means of a groove for instance. The axial bearing pin is supposed to be of so small a diameter that further weakening by such measures is unacceptable.

At the same time, means securing against this axial displacement shall be so designed that they will not degrade the easy motion, that is, they must simultaneously be designed as bearing means. Furthermore, they shall also prevent warping of the roller. Warping would substantially increase bearing friction because for the extreme ratio selected of outside diameter to bearing diameter of the roller, even slight warping already may introduce additional friction at the bearing surface, and the effect would be especially interfering considering the high pressures anyway already encountered.

In one embodiment of the invention, the support and/or guide roller comprises concentric, elastic claws mounted to that of its sides facing the rail of the furniture, said claws when slipped onto the bearing pin then encloses its collar.

The invention permits the desired light motion because the bearing diameter of the bearing pin can be kept arbitrarily small within the range of the required strength, as the fastening means, i.e. the claws make it possible to press the roller on the axial bearing pin in the manner of a snap button, whereby it is possible to axially guide the roller while it is supported without there being a flange on the outside of the bearing pin.

The collar of the axial bearing pin may be advantageously as large as possible so that on one hand the rivet-connection to the furniture rail will thus be improved due to the large resting surface, and on the other hand to implement the snap means.

The invention offers another advantage by allowing to rivet the axial bearing pin to the furniture rail without the roller being pre-mounted. This step of the procedure will not damage the roller. Furthermore automated fastening of the axial bearing pin now is simplified manifold.

Another advantage is the exchangeability of the support and/or guide roller. Whatever the reasons, the roller can be removed at any time from the axial bearing pin and be replaced by another.

BRIEF DESCRIPTION OF THE DRAWINGS

The drawings represent an illustrative embodiment of the object of the invention; further features of the invention will be made clear in relation to the drawing and the description.

DETAILED DESCRIPTION OF THE DRAWINGS

Figure 1:
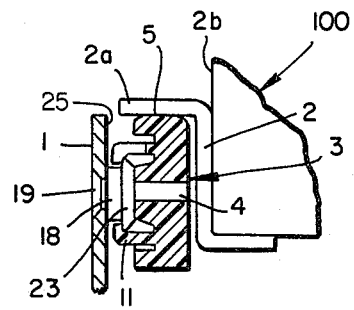
FIG. 1 is a cross-section of the support and/or guide roller in the assembled state with the furniture and drawer rails.

FIG. 1 shows merely a left-hand part of a drawer pull-out means, the right-hand part being the mirror image with identical functions. Depending on the application, the support and/or guide roller also can be mounted to the drawer rail, or one roller is mounted to the furniture rail and the other to the drawer rail. Again, the number of rollers and their mounting to one of the guide rails is arbitrary.

The shape of the furniture and drawer rails shown in FIG. 1 may vary depending on application. The design of FIG. 1 is described below as being representative.

The horizontally retractable drawer 100 is mounted relative to a rail 1, with the drawer rail 2 mounted relative thereto and including a horizontal flange 2a pointing away from the draw wall 2b. This horizontal flange 2a rolls on the support and/or guide roller 3 having an outer diameter 5, when the drawer 100 is pulled out and moved in. The support and/or guide roller 3, as illustrated in FIG. 3, revolves by means of a concentric bearing bore 6 coaxially mounted on the bearing shaft 7 of the axial bearing pin 4 illustrated in FIG. 2. The axial bearing pin 4 is mounted on one side thereof to the furniture rail 1, preferably in riveted form, so that the load absorbed by the support and/or guide roller 3 from the drawer 100 is transmitted through the axial bearing pin 4 to the furniture rail 1. By using plastic as the roller material, self-lubrication is obtained between roller 3 and the metal bearing shaft 7 and furthermore damping of the rolling noise.

Figure 2:
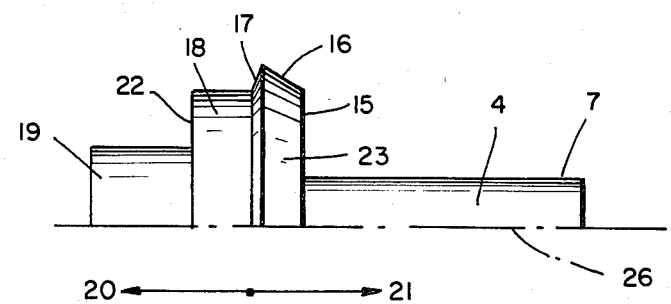
FIG. 2 is a half view of the axial bearing pin of FIG. 1.
Figure 3:
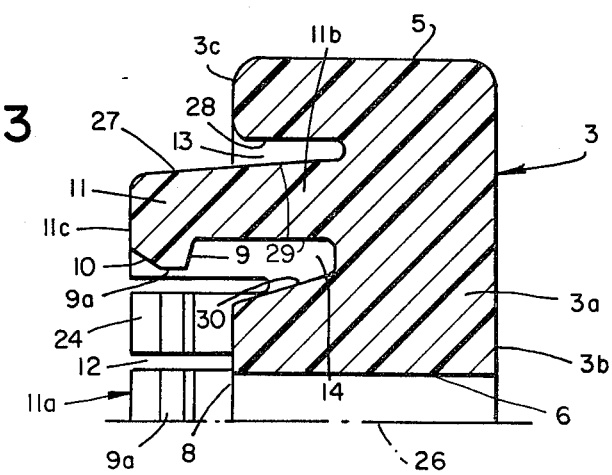
FIG. 3 is a half cross-section of the support and/or guide roller of FIG. 1.

In order to transmit the load to the furniture rail 2, it is necessary that the bearing pin 4 has a resting surface 22 on the collar 18, which resting surface 22 is as large as possible as illustrated in FIG. 2. This is achieved by a correspondingly large diameter of collar 18. When the rivet pin 19 on the back side of the furniture rail 1 is being riveted, the resting surface 22 is drawn against the front side 25 of this furniture rail 1 and results in a one-sided, stable anchoring of the axial bearing pin 4 in the furniture rail 1. The cylindrical collar 18 of the axial bearing pin 4 is joined by a collar 23 of somewhat larger diameter and comprising at its outside circumference a shoulder 17 which is oblique with respect to the riveting side while being provided with an insertion bevel 16 in the direction of the bearing shaft 7. The bearing shaft 7 is kept as small as possible in diameter and joins the plane face 15 of the collar 23. The rivet pin 19, the collars 18 and 23 as well as the bearing shaft 7 are all coaxial.

The support and/or guide roller 3 besides the above described outside diameter 5 and bearing bore 6 also comprises fastening or coupling means 11' consisting of concentric elastic claws 11 as illustrated in FIG. 3, which are cast integrally with the roller 3. The roller 3 includes a body portion 3a having oppositely disposed surfaces 3b and 3c that may extend parallel to each other and in a plane normal to the roller axis 26. Slits 12 are radial to the roller axis 26 and divide the spring-elastic claws 11 into equal segments 24. Each claw 11 includes an insertion flange 10 on the outside thereof, a shoulder 9 at the inside thereof and a lip 9a extending therebetween. The lips 9a form a circular configuration for abutting engagement with the collar 18. A stem 11b joins the claws 11 to the body portion 3a. Each claw 11 terminates in a free end 11c. The inside width of the claws as defined by the lips 9a exceeds the diameter of the bearing bore 6. Recess 13 may extend circumferentially between the outer surface 27 of each of the claws 11 and the wall 28 of the roller 3. A groove 14 extends circumferentially between the inner surface 29 of each claw 11 and the wall 30.

The depth of the slits 12 depends on the elasticity of the material used, and the slits 12 are sufficiently sized as to ensure that the claws 11 can be flexed to engage the collars so that each of the claw segments 24 following set-up of roller 3 on the bearing shaft 7 and pressing of roller 3 in the direction of set-up 20 will be radially forced apart by the insertion bevel 16 of the axial bearing pin 4 against the insertion bevel 10. After the roller 3 is further pressed by hand or machine, the beaks 11a of claws 11 snap behind the oblique shoulder 17 of collar 23 of the axial bearing pin 4, whereby the claws 11 now grip around the collar 23. The shoulder 9 slanting inward with respect to the roller 3 corresponds in its angle with the oblique shoulder 17 and together with same forms the thrust bearing in the direction 21. The thrust bearing in the direction 20 is assumed by the face 15 of the axial bearing pin 4 cooperating with the face 8 of the roller 3. To prevent jamming of the rollers on the collars 18 and 23 a minimal bearing play is provided between the corresponding diameters of both pieces. The shallowness of the slant of shoulders 9 and 17 permits removing the roller 3 from the axial bearing pin 4 when necessary.

The support roller 3 becomes simultaneously a guide roller if for instance the outside diameter 5 is profiled and moves along a correspondingly shaped contour of the drawer rail 2, or when the support roller of FIG. 1 is surrounded in part by the drawer rail 2, whereby again sideways guidance of the roller 3 is achieved. Conceivably another system of roller may assume the load transmission and the roller 3 of the invention is used only for guidance.

Hereinbefore has been disclosed a novel support and-/or guide roller with axial bearing pin for drawer pull out means or the like. It will be understood that various changes in the details, materials, arrangement of parts and operating conditions which have been herein described and illustrated in order to explain the nature of the invention may be made by those skilled in the art within the principles and scope of the present invention.

What is claimed is:

1. Support and guide roller adapted to be mounted on an axial bearing pin of relatively small diameter for drawers, comprising:
   A. a body portion fabricated from a plastic material with a relatively large outer diameter which when mounted on said pin forms a load-transmitting bearing both in the radial and in the axial direction thereof,
   B. coupling means for detachably securing the support and guide roller to said pin,
   C. said coupling means formed of concentrically arranged spring-elastic claws, each one of said claws adapted to be detachably connected in a force-locking manner with said pin, so as to obtain a securing of the support and guide roller with respect to axial displacement while guiding a drawer as movement thereof occurs relative to said pin,
   D. said claws are divided by radially directed slits into a number of segments and are molded of one piece with the support and guide roller, and said slits are sufficiently sized to ensure that said claws can be flexed to engage said pin, and
   E. said axial bearing pin having a bearing shaft and a rivet pin at opposite ends thereof with a pair of adjacent collars of greater diameter than said bearing shaft and said rivet pin, said adjacent collars being disposed between said bearing shaft and said rivet pin.

2. Support and guide roller in accordance with claim 1, wherein said claws are each provided with an insertion flange at their outside so as to facilitate assembly with said pin.

3. Support and guide roller in accordance with claim 2, wherein said claws each include a shoulder at the inside of said claw, said shoulder extending obliquely to the open side of said claw.

4. Support and guide roller in accordance with claim 1, wherein one of said collars includes an insertion bevel on the side of said bearing shaft and forms an oblique shoulder on the opposite side thereof.

5. Support and guide roller with an axial bearing pin in accordance with claim 4, wherein said collars of said axial bearing pin is guided by its face and said oblique shoulder between the face and the oblique shoulder of the roller so as to leave some play.

6. Support and guide roller in accordance with claim 1, wherein the inside width of said claws exceeds the diameter of the bearing bore.

7. An assembly for supporting a drawer relative to a rail, said assembly comprising:
   A. an axial bearing pin of relatively small diameter having a bearing shaft and a rivet pin at opposite ends thereof, with a pair of adjacent collars of substantial diameter relative to said bearing shaft and said rivet pin, said adjacent collars being disposed therebetween, said rivet pin adapted to be secured to the rail of said drawer,
   B. one of said collars including an insertion bevel on the side of said bearing shaft and forming an oblique shoulder on the opposite side thereof,
   C. a support and guide roller having an axial bore and a relatively large outside diameter, said support and guide roller adapted to be mounted on said bearing shaft and forming together with said axial bearing pin a load-transmitting bearing both in the radial and in the axial directions thereof,
   D. coupling means integrally formed on said roller,
   E. said coupling means formed of concentrically arranged spring-elastic claws and adapted to be detachably connected in a force-locking manner with said collars, for securing said support and guide roller with respect to axial displacement while guiding it on said rail,
   F. said claws being provided with an insertion flange at the outside thereof, and
   G. said claws each including a shoulder at the inside thereof, said shoulders each extending obliquely to the open side of their respective said claws so as to obtain releasable securement of said claws on said collar of said axial bearing pin such that said support and guide roller is guided by its face and said oblique shoulder with certain play therebetween as rolling is maintained in the assembled relationship.

8. An assembly in accordance with claim 7, wherein:
   a. said claws are molded of one piece with said support and guide roller,
   b. said claws are divided by radially directed slits into a number of segments,
   c. said slits are sufficiently sized as to ensure that said claws can be flexed to engage said collars, and
   d. said claws terminate in a lip adapted to extend adjacent to said collar on the side of said rivet pin.

9. An assembly in accordance with claim 8, wherein said shoulder of each said claw snaps behind said oblique shoulder of said collar for retainment of said support and guide roller with respect thereto.

10. An assembly in accordance with claim 9, wherein said insertion flange is adapted to engage said insertion bevel to obtain expansion of said claws until the assembled relationship therebetween is obtained.

* * * * *